United States Patent [19]
Wharton

[11] 3,793,669
[45] Feb. 26, 1974

[54] MEANS FOR CLEANING MOTOR ROAD VEHICLE HEAD LAMPS

[76] Inventor: William Wharton, Piccotts End House, Hemel Hempstead, England

[22] Filed: May 30, 1972

[21] Appl. No.: 257,547

[52] U.S. Cl. ............................................ 15/250.22
[51] Int. Cl. ............................................ B60s 1/44
[58] Field of Search........ 15/250.22, 250.3, 250.01, 15/250.02, 250.12

[56] References Cited
UNITED STATES PATENTS
| | | | |
|---|---|---|---|
| 2,884,656 | 5/1959 | Bryant | 15/250 |
| 3,662,426 | 4/1970 | Wharton | 15/250.22 |

FOREIGN PATENTS OR APPLICATIONS
| | | | |
|---|---|---|---|
| 714,779 | 9/1954 | Great Britain | 15/250.22 |
| 1,392,585 | 2/1965 | France | 15/250.22 |

Primary Examiner—Peter Feldman
Attorney, Agent, or Firm—Burns, Doane, Swecker & Mathis

[57] ABSTRACT

Wiper means adapted automatically to keep the front glass of a road vehicle headlamp clean as the vehicle is driven along, such means including a member which in use is disposed and is rotatable in a plane substantially parallel to the front glass of the headlamp, which member is adapted to drive a wiper element and has thereon blades arranged so that air flowing radially outwards over them from the centre of the member will cause rotation of the latter.

4 Claims, 4 Drawing Figures

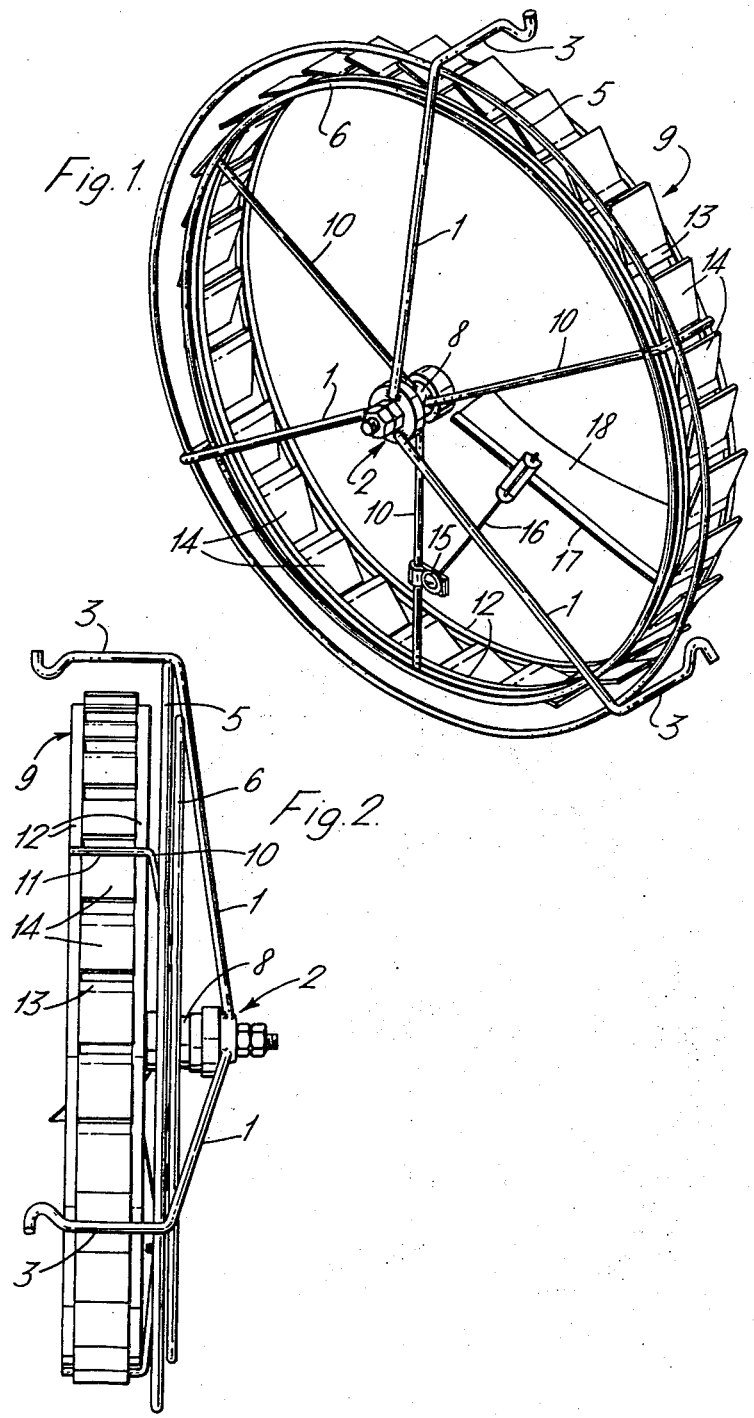

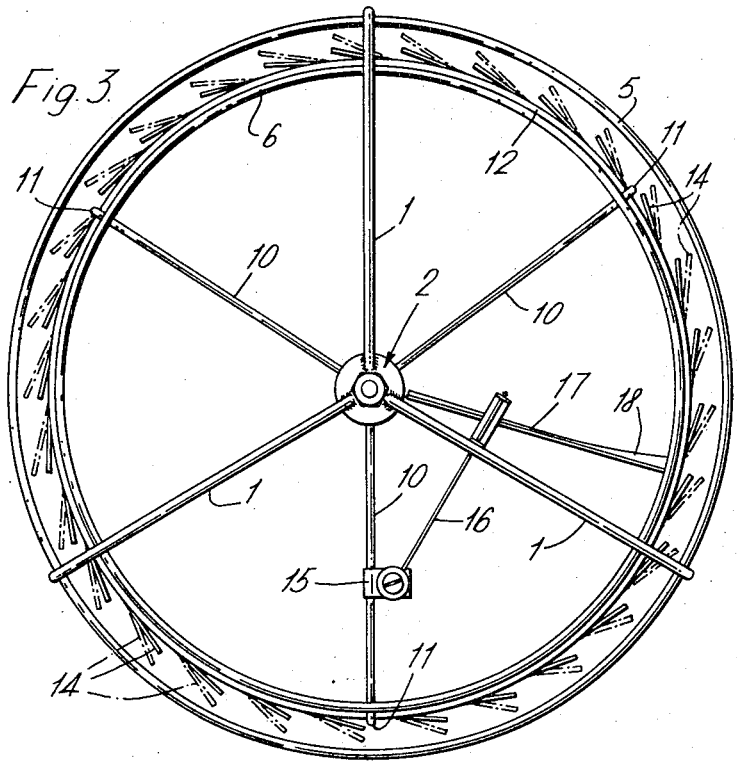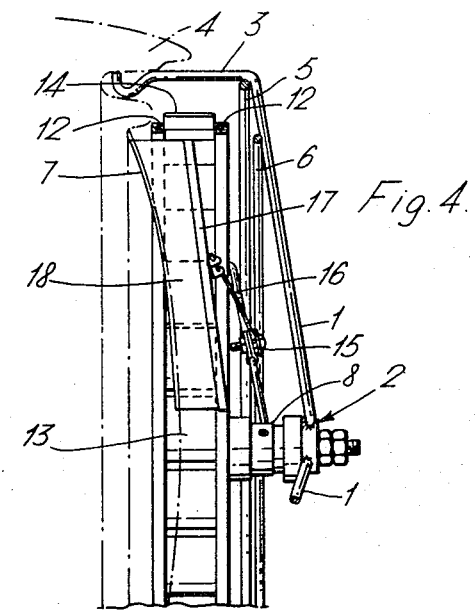

MEANS FOR CLEANING MOTOR ROAD VEHICLE HEAD LAMPS

BACKGROUND OF INVENTION

This invention relates to means for cleaning motor road vehicle headlamps.

Drivers of all types of motor road vehicles find, when driving at night, especially on wet roads used by heavy goods vehicles, that the front glasses of their headlamps quickly become very dirty, thus rendering the headamps virtually useless. It is therefore necessary frequently to stop and clean the front glasses of the headlamps by hand, and this in itself, apart from anything else, can nowadays be dangerous, not only for the actual driver concerned but also for other road users.

The present invention has for its object to provide neat and compact means for the automatic cleaning of the front glasses of motor road vehicle headlamps thereby eliminating the need for stopping to clean them by hand.

SUMMARY AND DESCRIPTION OF INVENTION

According to this invention there is provided for a motor road vehicle headlamp, wiping means adapted automatically to keep the front glass of the headlamp clean as the road vehicle carrying the headlamp is driven along, such means including a member which in use is disposed and is rotatable in a plane substantially parallel to the front glass of the headlamp which member is adapted to drive a wiper element and has thereon blades arranged so that air flowing radially outwards over them from the centre of the member will cause rotation of the latter.

BRIEF DESCRIPTION OF DRAWINGS

FIG. 1 shows in perspective wiping means in accordance with a preferred embodiment of this invention, FIG. 2 is a side elevation of such wiping means, and FIG. 3 is a front elevation thereof; and FIG. 4 is a broken side elevational view showing the wiping means of FIGS. 1 to 3 applied to a headlamp.

DESCRIPTION OF SHOWN EMBODIMENTS

The wiping means shown in the drawings is designed for use with a road vehicle headlamp having a circular or substantially circular front glass. There is a rigid support frame made up of three arms 1 radiating from a bearing element 2, each arm having at its outer end a rearwardly extending leg 3 adapted for engagement with or in a headlamp casing 4, as indicated in FIG. 4, and two concentric rings 5 and 6 fixed to the outer end portions of the legs 3.

The bearing element 2 is, in use, spaced from but boaxial with the centre of the front glass 7 of the headlamp (FIG. 4). Rotatably mounted on the bearing element 2 is the hub 8 of a ring like rotor 9. This rotor has a number of spokes 10, for example three, which extend radially outwards from the hub 8, the outer end of each spoke being bent rearwardly to form a support member 11. Fixed to the front and rear ends of the support members 11 are two rings 12. Fixed to and extending between these two rings is a strip of rubber or like material 13 which has been cut to form therein a plurality of regularly spaced flaps or blades 14.

Fixed to one of the spokes 10 is a bracket 15 to which is connected one end of a flexible arm 16, to the other end of which is fixed a rigid channel shaped strip 17 with a flexible wiper blade 18 secured therein. The inner free edge of the wiper blade may be shaped as shown, that is in accordance with the shape of the outerface of the front glass 7 of the headlamp. However, the flexible arm 16 allows the wiper blade 18 in its carrier strip 17 to adapt its position with respect to headlamp front glasses of any form.

Assuming that wiping means as above described has been applied to the headlamp of a vehicle, when the latter is driven along, air impinges on the front glass of the headlamp and is thereby deflected outwardly over and between the flaps or blades 14 in the rotor 9. The rotor will thereby be caused to rotate, carrying with it the wiper blade 18 which keeps the front glass clean. As the speed of the vehicle increases so the force of air impinging on the flaps or blades 14 will increase, flexing them outwardly more and more, as indicated by broken lines in FIG. 3. The effective force rotating the rotor 9 will thus not increase with the vehicle speed but will tend to remain more or less the same as at low speeds when the flaps or blades 14 are not flexed outwardly so much.

As mouldings in some headlamp casings may interfere with the rotation of the rotor and/or its wiper blade, a plain sheet of glass or other transparent material may be disposed between the headlamp front glass and the wiper blade. The rotor with the wiper blade could be rotatably mounted on such plain sheet of glass or other material, that is at the centre thereof.

Wiping means as above described may be housed in a compact cowling which may easily be fixed to an existing headlamp causing or formed as a part thereof. This cowling may have slots or other apertures therein adapted to be opened and closed so that the wiping means can be brought into operation or rendered inoperative as and when required. By opening such slots or apertures to a greater or less degree the speed of rotation of the rotor may further be controlled.

When a vehicle has twin headlamps, wiping means may be provided for the front glass of each with a common drive means, for example in the form of a perforated ladder-like belt running on pairs of spaced spider wheels and having thereon suitable driving blades.

I claim:

1. For a motor road vehicle headlamp, wiping means adapted automatically to keep the front glass of a headlamp clean as the vehicle carrying the headlamp is driven along, said wiping means including a wiper element and a member which in use is disposed and is rotatable in a plane substantially parallel to the front glass of the headlamp, said member being adapted to drive said wiper element and having thereon blades arranged so that air flowing rapidly outwards over said blades from the center of the member will cause rotation of said member, said member comprising a ring like rotor rotatable about an axis perpendicular to the front glass of the headlamp and having a circumferential wall in which the said blades are disposed, said circumferential wall being formed by two spaced rings with a strip of material such as rubber fixed to and extending between said rings, said blades being formed by said strip having been cut to form therein a plurality of regularly spaced flexible blades.

2. Wiping means as claimed in claim 1 wherein the rotor is rotatably mounted in a rigid support frame adapted for engagement with the headlamp casing.

3. Wiping means as claimed in claim 2 wherein the support frame includes a bearing element, and the rotor includes a hub which is rotatably mounted on such bearing element, the circumferential wall of the rotor being connected to the hub by a number of spokes on one of which is mounted the wiper element.

4. Wiping means as claimed in claim 3 wherein the wiper element is mounted on said spoke by means including a flexible member which permits the wiper blade to adapt its position with respect to the headlamp front glass.

* * * * *